No. 750,319. PATENTED JAN. 26, 1904.
W. A. TARBETT.
PAPER FEEDING MECHANISM.
APPLICATION FILED FEB. 14, 1903.
NO MODEL. 5 SHEETS—SHEET 1.
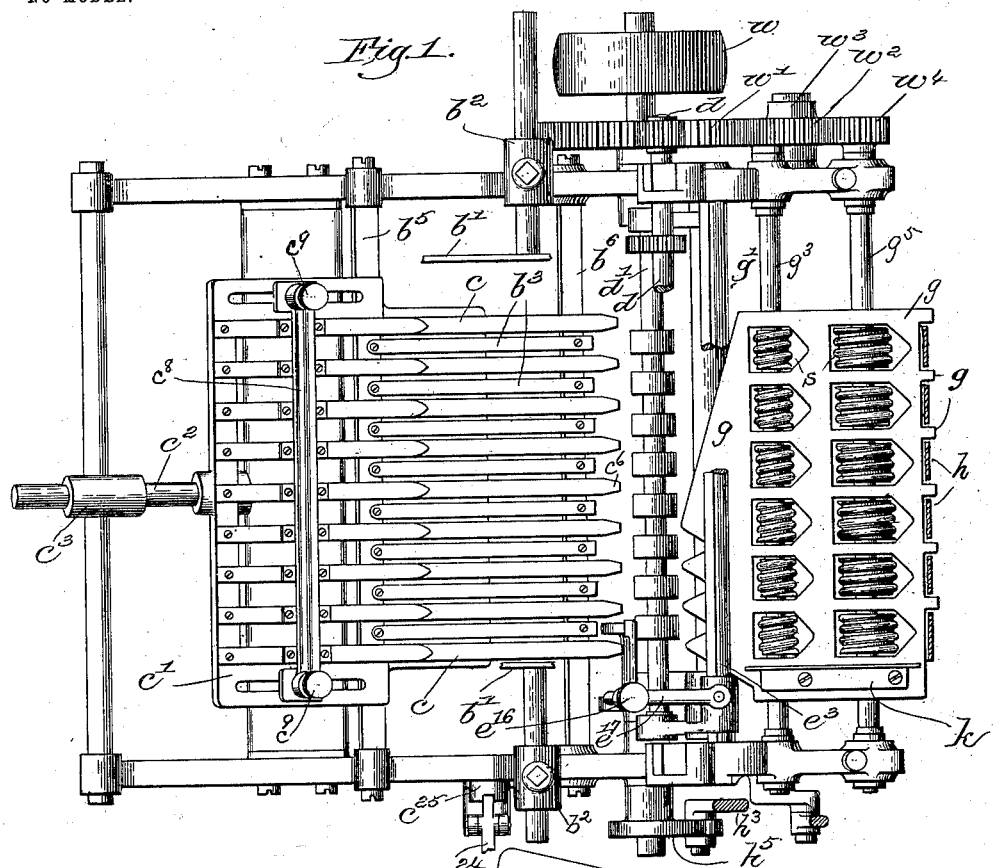
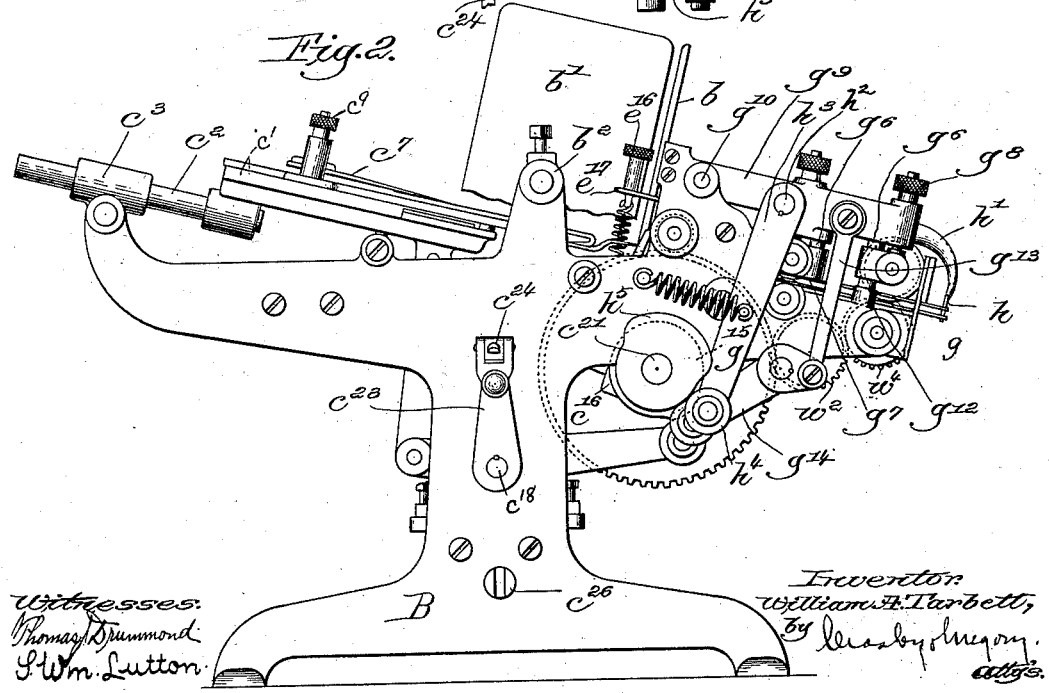
Witnesses:
Thomas Drummond
S. Wm. Lutton
Inventor:
William A. Tarbett,
By Crosby Gregory
Atty's.

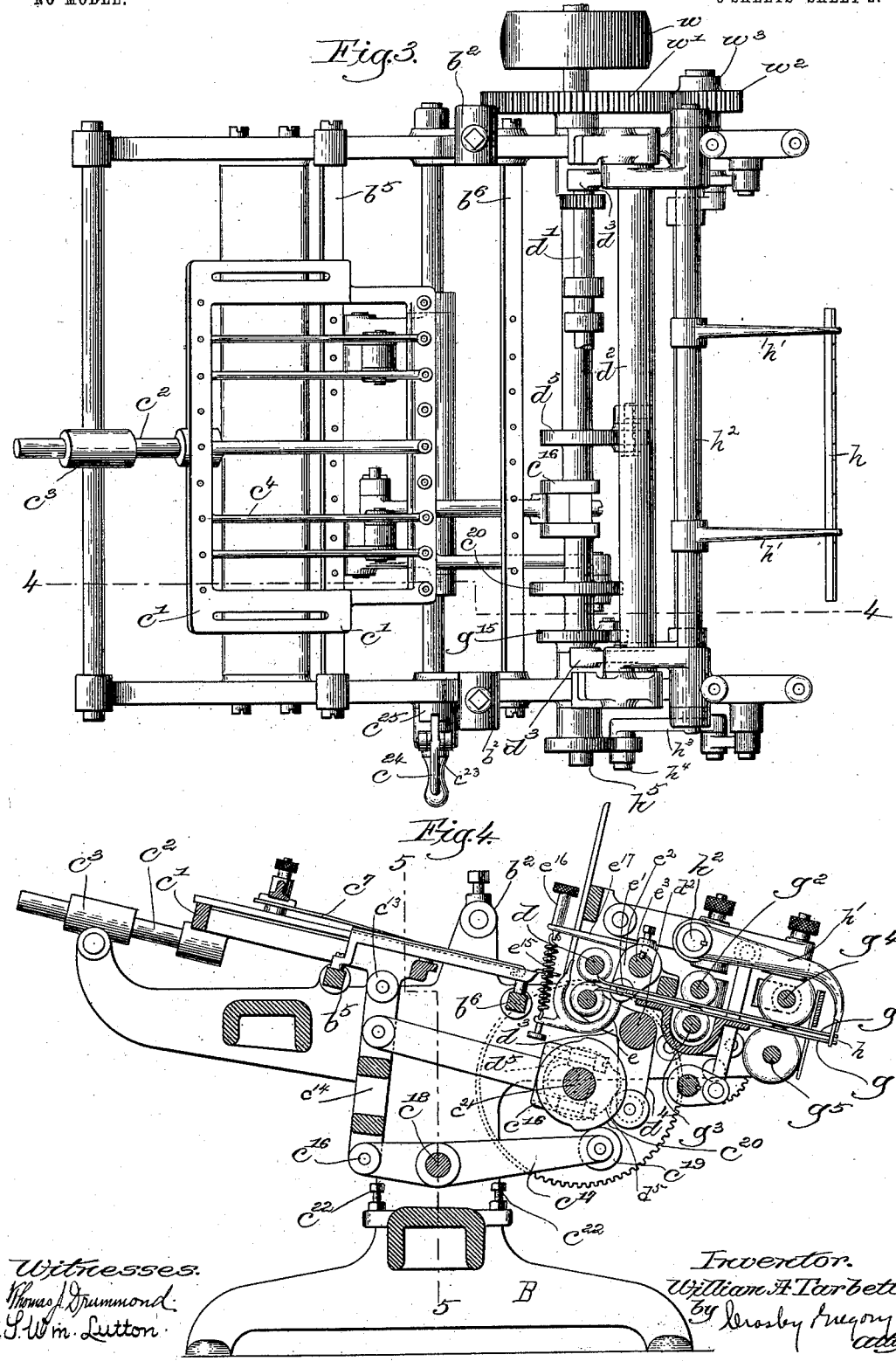

No. 750,319. PATENTED JAN. 26, 1904.
W. A. TARBETT.
PAPER FEEDING MECHANISM.
APPLICATION FILED FEB. 14, 1903.
NO MODEL. 5 SHEETS—SHEET 3.
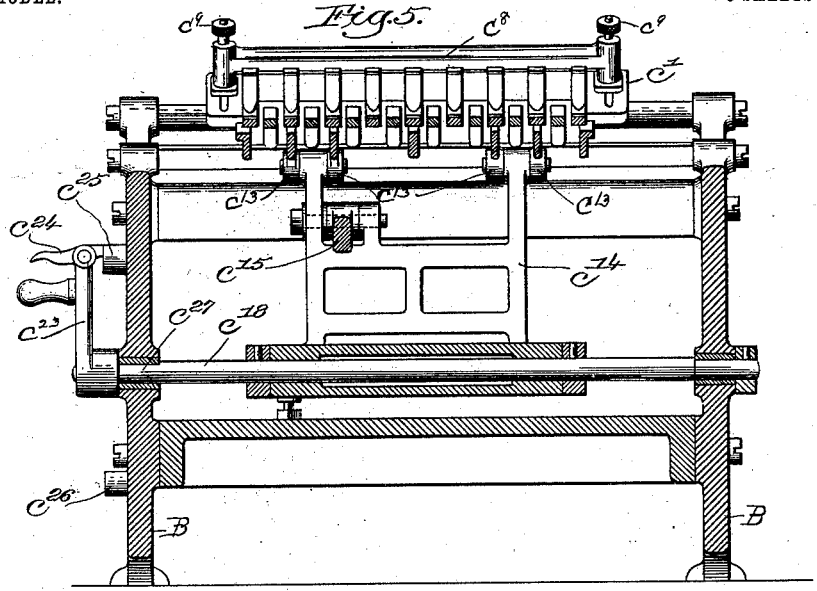
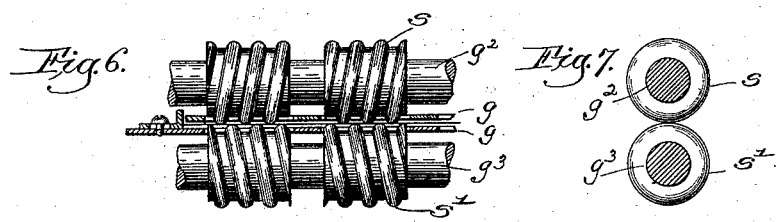
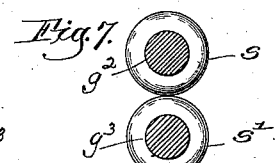
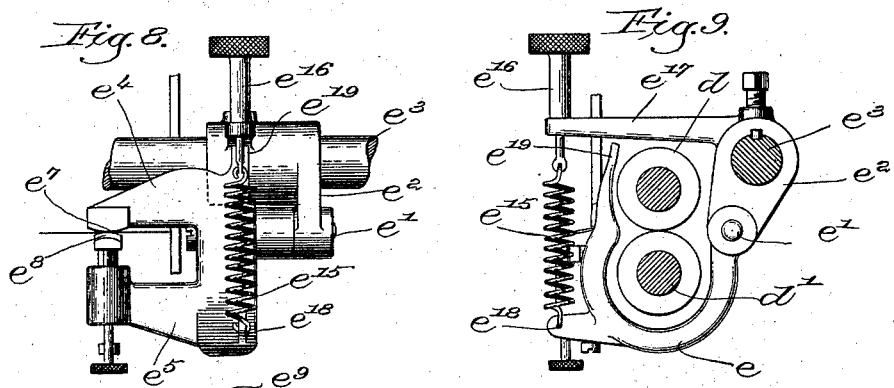
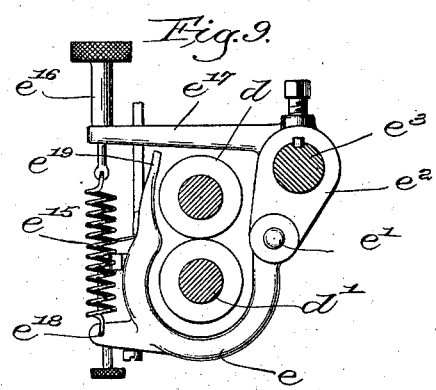
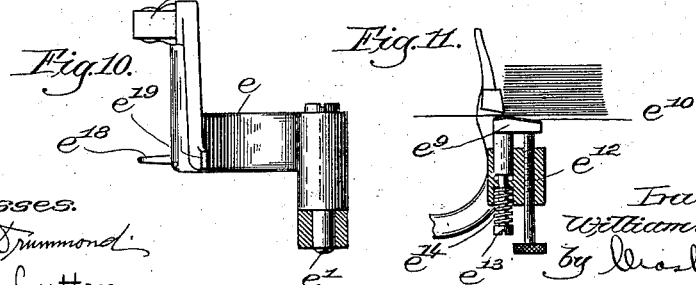
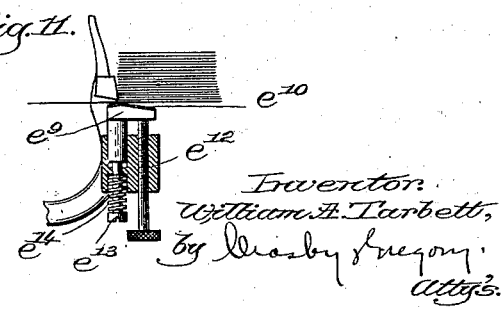

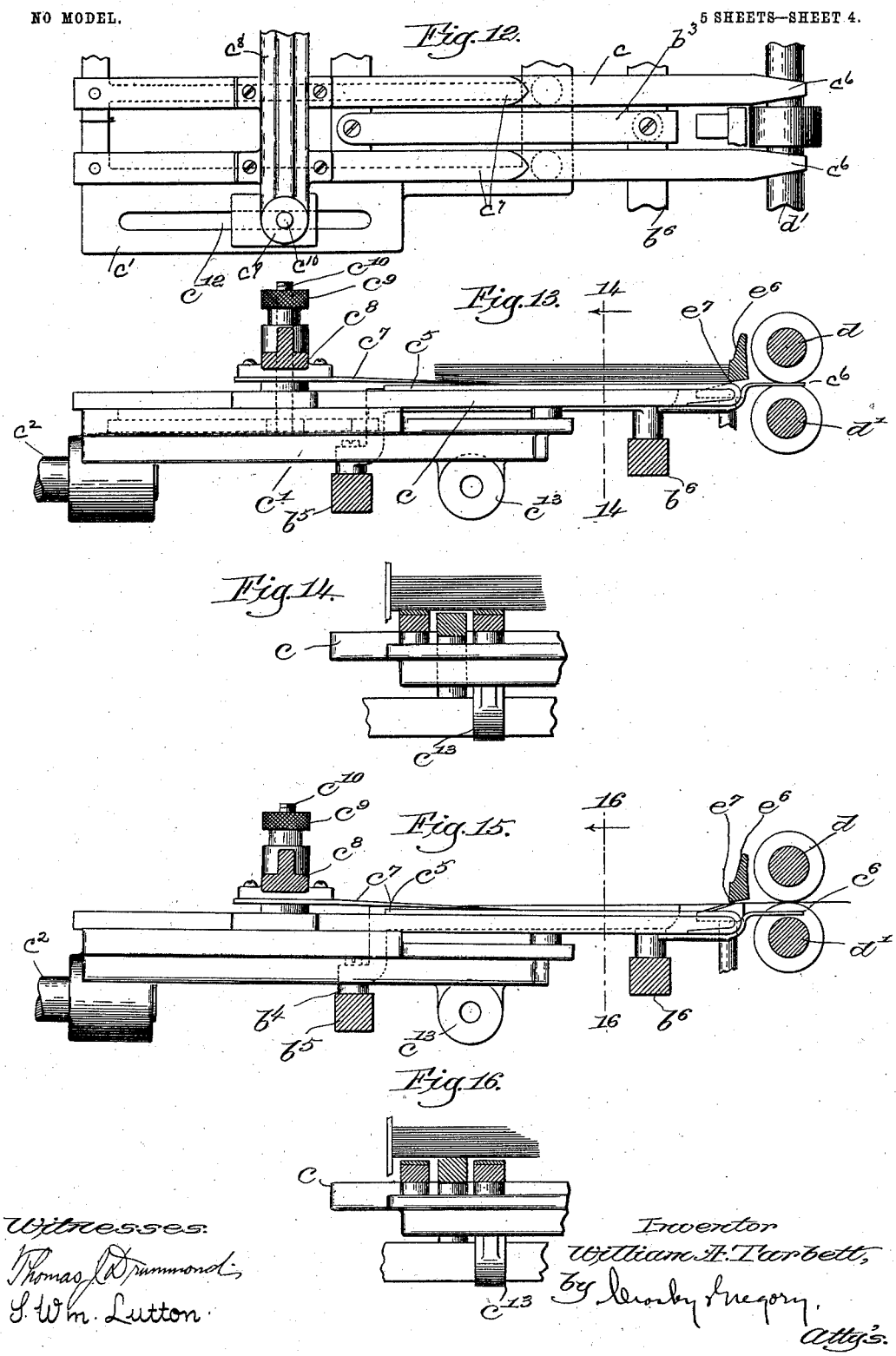

No. 750,319. PATENTED JAN. 26, 1904.
W. A. TARBETT.
PAPER FEEDING MECHANISM.
APPLICATION FILED FEB. 14, 1903.
NO MODEL. 5 SHEETS—SHEET 5.
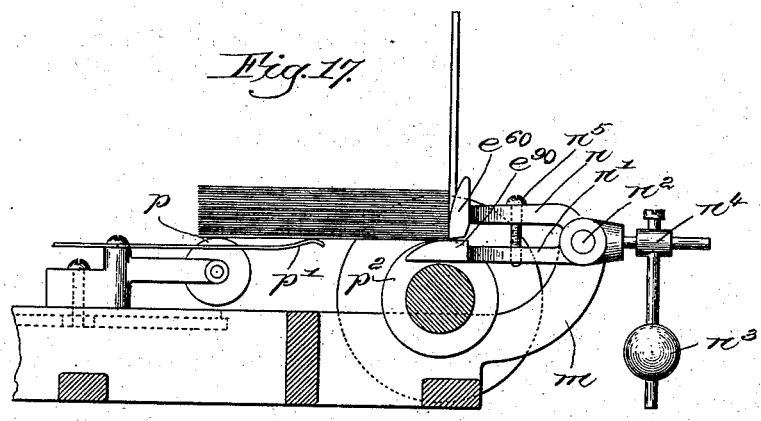
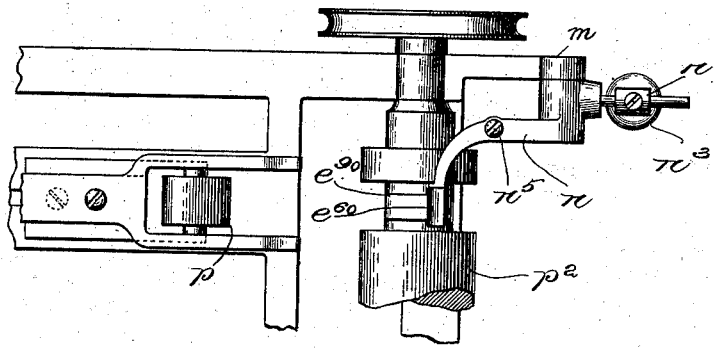

No. 750,319. Patented January 26, 1904.

UNITED STATES PATENT OFFICE.

WILLIAM A. TARBETT, OF STONEHAM, MASSACHUSETTS, ASSIGNOR TO WILLIAM B. COHEN, OF SALEM, MASSACHUSETTS.

PAPER-FEEDING MECHANISM.

SPECIFICATION forming part of Letters Patent No. 750,319, dated January 26, 1904.

Application filed February 14, 1903. Serial No. 143,406. (No model.)

*To all whom it may concern:*

Be it known that I, WILLIAM A. TARBETT, a citizen of the United States, residing at Stoneham, county of Middlesex, State of Massachusetts, have invented an Improvement in Paper-Feeding Mechanism, of which the following description, in connection with the accompanying drawings, is a specification, like letters on the drawings representing like parts.

My present invention is a feeding mechanism for feeding flat sheets of cardboard, paper, or similar material one sheet at a time from the bottom of a stack to another machine for treating the paper, &c., such as a printing-press or paper-cutter or machine for folding, embossing, ruling, &c.

The main object of my invention is to enlarge the scope or field of usefulness of feeding-machines, while at the same time rendering the same more accurate and less liable to waste and injure the stock being fed.

In the accompanying drawings, in which I have shown a preferred embodiment of the invention, Figure 1 is a top plan view thereof, parts being omitted and broken away for clearness of illustration. Fig. 2 shows the same in side elevation. Fig. 3 is a view similar to Fig. 1, parts being removed. Fig. 4 is a vertical longitudinal sectional view on dotted line 4 4, Fig. 3. Fig. 5 is a transverse vertical section taken on the line 5 5, Fig. 4. Fig. 6 is a fragmentary view, partly in section, showing the feed-rolls in side elevation. Fig. 7 is a cross-sectional view of said feed-rolls. Figs. 8 and 9 are views showing, respectively, in rear and end elevation one form of the separator mechanism. Fig. 10 is a detail thereof in top plan, partly in section. Fig. 11 is a detail view of a portion of Fig. 8 looking at the latter from the left. Figs. 12 to 16 show fragmentary details of the supporting and feeding mechanism adjacent the hopper, Fig. 12 being a view in top plan, Figs. 13 and 15 in longitudinal vertical section, the former being taken on the line 13 13 and the latter on the line 15 15, Fig. 12, showing the feed mechanism, respectively, in operative and inoperative position. Figs. 14 and 16 are sectional details on the lines, respectively, 14 14, Fig. 13, and 16 16, Fig. 15. Figs. 17 and 18 are fragmentary views in vertical longitudinal section and in top plan of a modified form of feed.

I provide an independent support for the paper which does not bring the pressure of the stack at the front and rear edges thereof, but distributes the same elsewhere, and the paper is fed to a yielding throat-piece or delivery device, mechanism also preferably being provided for maintaining a uniform upward pressure at the delivery end of the sheets entirely independent of the amount of stock in the hopper, and I provide a frictional device which engages the stock at all points and maintains such engagement until the feeding is substantially accomplished, the feed being of the four-motion kind, and when the sheet is delivered the further feeding and adjusting mechanism gets the sheet into exactly correct shape and arrangement for final delivery to the main machine irrespective of whether the sheet is thick or thin, flat or curly, hard or spongy, &c., and preferably also all these mechanisms are capable of adjustment for a wide variety of stock.

Mounted on a suitable base or frame B is a hopper composed of a front fence $b$ and side fences $b'$, adjustably mounted in bearings $b^2$ at the opposite sides of the machine, in which a stack of paper may be held, the support thereof being herein shown as composed of a series of strips or slats $b^3$, carried by a bridge-plate $b^4$, supported on cross-bars $b^5$ $b^6$. Between these slats $b^3$ I provide feeders, herein shown as fingers or arms $c$, mounted on a frame $c'$, guided at its rear end by a rod $c^2$, reciprocating in a pivoted sleeve $c^3$, said frame being shown in Fig. 3 as braced by connecting-rods $c^4$. The feeders $c$ are shown in detail in Figs. 12 to 16, where it will be seen that they are provided with a strip $c^5$ of rubber or other frictional substance and carry a thin finger-like extension end $c^6$, adapted to support the extreme front edge of the sheet when they are raised against the same and also serve to guide the sheet between the feed-rolls $d$ $d'$ immediately in front of the hopper, which are separated and closed in unison with the rising and falling of the feeding mechanism by a rock-shaft $d^2$, which supports the lower roll $d'$ by arms $d^3$ and is rocked by a cam-lever $d^4$, actuated by a cam $d^5$.

At the lower front edge of the stack of paper just behind the feed-rolls I provide the yielding delivery device or throat-piece, to which reference has already been made, it being sufficient when small pieces of paper or cardboard are to be fed to provide one of these, although one at each side of the stack may be employed, according to the requirements of the case. As herein shown, I have provided one of these devices at the right-hand corner or near side, as shown in the drawings.

Referring more particularly to Figs. 8 to 11, in connection with Figs. 1, 2, and 4, it will be seen that the throat-piece is supported by a U-shaped yoke or hanger $e$, freely pivoted at $e'$ to a bracket $e^2$, fast on a rod $e^3$, along which it is adjustable for varying widths of sheets, said rod being also adapted to receive an opposite throat-piece at the other side of the machine for extra wide sheets. At its rear or free end the yoke $e$ has two laterally-projecting arms $e^4$ $e^5$, (see Figs. 8 and 10,) the upper one, as herein shown, (see Figs. 13 and 15,) having a relatively broad lip $e^6$, between whose lower edge $e^7$ and the upper edge $e^8$ of an under lip $e^9$ the paper is delivered. One of these lips is made adjustable, the lower one preferably, as herein shown, and said lower lip is also shown as provided (see Fig. 11) with a rearward incline $e^{10}$ and is adjustable by means of a stop-screw $e^{12}$, limiting the downward movement, and a set-screw $e^{13}$ and spring $e^{14}$ coöperating therewith in positioning said jaw or lip. The yoke $e$ is held upward yieldingly by a spring $e^{15}$, whose tension may be regulated by a thumb-nut $e^{16}$, bearing on a rigid arm $e^{17}$ of the bracket $e^2$, said spring $e^{15}$ being connected at its lower end to the yoke $e$ at $e^{18}$, and said yoke is also preferably provided with a projection $e^{19}$ for abutting against the arm $e^{17}$ for limiting the upward movement.

By the construction of delivery device or throat-piece thus far described it will be seen that the stack of sheets is not supported thereby, but is supported by the slats $b^3$, which extend nearly, but not quite, to the forward end of the sheets, and the throat-piece is simply held upwardly against the bottommost sheet with sufficient pressure to insure that the front edge of said sheet will remain in constant contact therewith, so that any tendency of the same to spring or curl will be prevented, and yet the sheets will not be subjected to undue pressure, which might cause it to feed improperly, as explained. The spring $e^{15}$ is of sufficient strength to counteract the weight of the throat-piece and also to hold the lip $e^{10}$ in constant contact with the bottom sheet, and this contact may be increased sufficiently in the case of wrinkled or bent sheets to keep the leading edge thereof in proper alinement with the aperture in the throat-piece. The operation of the throat-piece will be absolutely uniform on all the sheets as they are fed, inasmuch as it is not stationary, but is held under the same tension by the spring $e^{15}$ against the under side of the sheets irrespective of whether there is a large stack of paper or a small stack thereof, and the throat-piece maintains its adjustment for the given thickness of paper entirely independent of the feeding mechanism and stack of paper.

A further feature of the feeding apparatus which is of importance for enabling the machine to feed small sheets or cards resides in providing shields or antifriction-plates $c^7$ for overlapping the rubber feeders to such an extent as may be desirable, according to the size of the card. The advantage of this will be more apparent viewing Fig. 13, where a small card is shown as being fed. In such instance the rubber $c^5$ of the feeder $c$ extends normally to the rear of the stack of sheets, so that when it is feeding the bottommost sheet forward the rear end of said feeder would drag along in contact with the next to the bottom sheet, thereby tending to feed that sheet forward also with the bottom sheet, and inasmuch as these feeders are intended to have a considerable frictional grip on the sheets this would result in disarranging if not spoiling the superimposed sheet, and for this reason the shield $c^7$ is adjusted forward beneath the rear edge of the stack sufficiently to overlie the rear end or idle portion of the feeder when the latter is in its most forward position, thereby preventing any possible contact of said idle portion of the feeder with the next to the bottom sheet. If a very short sheet is being fed, it will be evident that the shield will be adjusted forward to its extreme limit, whereas if the sheet is nearly as long as the feeder the shield will be adjusted backward correspondingly, and if the sheet is as long or longer than the feeder the shield need not be used at all. For the purpose of convenient adjustment the several shields $c^7$, one for each of the feeders having a frictional gripping-surface, are secured to a cross-beam $c^8$, provided at its ends with thumb-nuts $c^9$ and bolts $c^{10}$ for adjustment in ways $c^{12}$ toward and from the hopper.

At its under side the frame $c'$ is provided with ears $c^{13}$, (see Figs. 4 and 5,) to which are pivoted the upper ends of a bracket or braced arm $c^{14}$, pivotally connected by a link $c^{15}$ near its upper end to a crank $c^{16}$, by means of which it is reciprocated, and the lower end of said bracket $c^{14}$ is pivoted at $c^{16}$ to a lever $c^{17}$, mounted intermediately on an eccentrically-journaled shaft $c^{18}$ and provided with a cam-roll $c^{19}$ at its rear end for engagement with a cam $c^{20}$ on the drive-shaft $c^{21}$ of the machine, the cam $c^{20}$ and crank $c^{16}$ coöperating to give the feeders a four-motion movement.

When it is desired to stop feeding without stopping the machine—as, for instance, to refill the hopper or remove a defective sheet—the lever $c^{17}$ is lowered onto the supports or bolts $c^{22}$ by means of a hand-crank $c^{23}$, (see Figs. 2 3, and 5,) normally held in vertical position by a latch $c^{24}$, engaging a notch or yoke $c^{25}$, but capable of being unlatched and swung down into engagement with a notch $c^{26}$, thereby through the eccentric mounting at $c^{27}$ of the shaft $c^{18}$ lowering the lever $c^{17}$ into inoperative position, and thus preventing the feeders from being raised into engagement with the sheets.

The feed-rolls $d\,d'$ are cut away, as shown best in Fig. 1, to permit the supporting extremity $c^6$ of the feeders to enter between them for delivering a sheet of paper, as shown in Fig. 13, and then drop out of engagement therewith, as shown in Fig. 15. As the paper is fed through between said rolls it is received by the flaring lips (see Fig. 4) of guide-plates $g$, these lips being preferably notched or nosed, as shown in Fig. 1, and the end thereof opposite the throat device cut away, as indicated at $g'$, this form serving to facilitate the free movement of the sheet in passing forward to the main feed-rolls $g^2\,g^3\,g^4\,g^5$. These feed-rolls are also formed in sections, and the guide-plates $g$ are cut out to coöperate therewith, as shown clearly in Figs. 1 and 6. The formation of these feed-rolls is a further important feature of my invention.

Referring to Fig. 6, it will be seen that I provide a spirally-beaded feeding-surface herein shown and preferably on both rolls and formed, respectively, as right and left spirals $s\,s'$, which coöperate with the stop-gate $h$ at the front of the machine and the side gate or gage-plate $k$ at the side of the machine in straightening out and adjusting the sheet to proper position ready to be fed to the main machine. The front gate constitutes a halting device for checking the advance movement of the sheet, it being necessary to make the sheet move slower (or preferably actually stop) than the spiral surface in order that the latter may influence the sheet with a lateral movement. The front gate $h$ is herein shown as mounted on arms $h'$, fast on a shaft $h^2$, adapted to be rocked by a lever $h^3$, whose cam-roll $h^4$ is engaged by a cam $h^5$ on the main shaft, the side gage being indicated as stationary at $k$, Fig. 1.

The upper feed-rolls are mounted at their ends in adjustable journals $g^6$, sliding on studs $g^7$ and adjusted by thumb-nuts $g^8$ in a swinging frame $g^9$, pivoted at $g^{10}$ to the main frame of the machine. The forward set of studs $g^7$ is arranged to contact with a block $g^{12}$ on the main frame of the machine for limiting the downward movement of the swinging frame, the latter being raised at the proper time by links $g^{13}$, operated by a bell-crank $g^{14}$ and cam $g^{15}$.

In use the paper having been fed forward as described is fed straight ahead by the feed-rolls $g^2\,g^5$ until it is stopped or checked by some retarding device, herein shown as the front gate $h$, whereupon the spiral form of said feed-rolls immediately shifts the paper over to the right against the side gage $k$. I prefer the stop-gate form of mechanism for retarding the sheet, as it is most convenient for stiff sheets; but it will be understood that for some uses, especially for thin sheets, which will not resist compression, a different form will be used. The feed-rolls are adapted to feed the paper not by hard contact, as in ordinary feed-rolls, but by slight frictional engagement, regulated by the adjustment of the feed-rolls, the spirals or beads on one roll being intermediate the beads on the opposite roll, so that the sheet is very slightly depressed or crimped between the rolls, but not enough to injure or distort it, thereby producing a sufficient frictional resistance to carry the sheet forward between the guide-plates until its front edge comes in contact with the stop-gate, whereupon the continued action of the feed-rolls, as already stated, adjusts the sheet in two directions, squaring it against the front gate and also against the side gate. Thereupon the feed-rolls are separated by the cam $g^{15}$ to permit the paper to recover its perfectly flat position and straighten out any wrinkles, &c., and immediately thereafter the front gate is raised and the rolls brought into feeding position again for feeding the sheet forward to the main machine.

The main shaft is operated from a belt-pulley $w$ and carries a gear $w'$, which drives a train of gears $w^2\,w^3\,w^4\,w^5$.

Various other forms of mechanism may be employed for carrying out my invention, although the particular mechanism thus far described is preferable for general purposes. For example, in some situations a simpler form of preliminary feeding mechanism for delivering the sheets from the stack may be employed, as indicated in Figs. 17 and 18, where it will be seen that the throat-piece is mounted on a stationary bracket $m$ and consists of arms $n\,n'$, pivoted at $n^2$ on said bracket, the latter arm being provided with a weight $n^3$, adjustable thereon at $n^4$ for maintaining the jaws $e^{60}\,e^{90}$ in proper yielding engagement with the stack of paper, said jaws being adjustable by a screw $n^5$ to vary the size of the throat and the stack of paper being supported by a roll $p$ and spring-arm $p'$ and fed forward by direct engagement with the under sheet of a feed-roll $p^2$, which gives a continuous feed instead of the intermittent motion of the previously-described mechanism.

In the course of the foregoing description I have already set forth quite fully the operation of the machine, but to summarize it at this point it is sufficient to state that when the paper is held in stacked form in the hopper and the machine set in operation the stack is supported by the grill-like support, which being in the form of parallel slats $b^3$ permits the rubber surface or other frictional surface of the feeders $c$ to rise between said slats sufficiently to get a strong frictional grip on the under side of the bottommost sheet without, however, rising sufficiently to lift the stack, excepting the slight amount required to clear said slats, and thereupon the feeding mechanism moves straight forward, the shields or antifriction-plates $c^7$ making it impossible that the next sheet above the one being fed should be disturbed by the feeding movement, and the feeders deliver the sheet to the initial feed-rolls $d\ d'$, the extreme front edge of the sheet being presented neatly and accurately by the projecting ends $c^6$ of the feeders. The sheet having been caught between the rolls $d\ d'$ the feeders fall out of frictional engagement with the sheet, and as the latter is supported by the slats $b^3$ while being drawn through the throat-piece the feeders are retracted in a lower plane, and just as the rear end of the sheet leaves the hopper the feeders are brought up again into contact with the next sheet, which is thereupon fed forward in turn. The danger of more than one sheet being delivered through the throat-piece or of the sheets getting jammed, &c., is obviated by having the throat-piece held yieldingly, or, in other words, provided with automatic means for maintaining it with uniform pressure against the under side of the stack, thereby obviating any tendency to crush or compress the front edge of the bottom sheets, which would render them unduly thin and make it possible for more than one sheet to enter the throat-piece. As the sheets fed pass forward between the slanting or nose-like surfaces of the feed-plates $g\ g$ they are successively caught by the main feed-rolls $g^2\ g^5$ and fed thereby in a straight line forward until they strike against the stop-gate $h$, whereupon the forward frictional engagement therewith of the right and left hand spirals of the feed-rolls immediately shift the sheets laterally against the side gate or gage $k$. The feed-rolls are then separated and the paper automatically straightens itself out, whereupon the feed-rolls are brought into frictional feeding engagement again with the sheet, and the front gate is at the same time lifted, permitting the sheet to pass forward to the printing-press, folding-machine, cutter, ruling-machine, or such other main machine as the present feeding-machine may be auxiliary to.

My invention enables the machine to have wide adaptability for all kinds, thicknesses, sizes, and amounts of sheets, as it may be adjusted with the utmost nicety and will maintain said adjustment and operate with the same efficiency under all circumstances.

As already intimated, I do not intend to restrict my invention to the mechanism herein shown, although I intend certain of the claims to cover specifically the various mechanical details and combinations herein presented; but it will be understood that many variations in form and arrangement and combination of parts may be resorted to within the spirit and scope of my invention, the latter being not limited otherwise than as expressed in the claims.

Some of the features of the invention are useful in other relations, and accordingly it will be noted that some of the claims cover subcombinations.

Having described my invention, what I claim as new, and desire to secure by Letters Patent of the United States, is—

1. In a machine of the kind described, means for holding a stack of sheets, means for feeding said sheets from the bottom of the stack, a delivery device including means for supporting the under side of the bottom sheet, and means for setting said delivery device to the thickness of the sheet, and means for maintaining the delivery device opposite the leading end of the bottom sheet with a uniform upward pressure.

2. In a machine of the kind described, a hopper for a stack of sheets, means for supporting said sheets to the rear of the front of the stack, yielding means for maintaining a uniform upward pressure beneath the front edge of the bottom sheet, and feeding mechanism for feeding the sheets successively from the bottom of the stack.

3. In a machine of the kind described, a hopper for a stack of sheets, feeding mechanism for feeding the sheets successively from the bottom of the stack, a movable delivery device provided with a narrow throat adapted to permit the passage of one sheet at a time, and means for automatically maintaining said throat and the front edge of the bottom sheet in accurate delivery alinement.

4. In a machine of the kind described, a hopper for a stack of sheets, feeding mechanism for feeding the sheets successively from the bottom of the stack, a delivery device for engaging the bottom sheet having a sheet-receiving throat formed by opposite jaws, means for adjusting said jaws toward and from each other, and means for regulating the upward pressure of said delivery device against the bottom sheet, independently of the size of the stack.

5. In a machine of the kind described, a hopper for a stack of sheets, feeding mechanism for feeding the sheets successively from the bottom of the stack, a delivery device pivoted at the front bottom edge of said stack and provided with arms carrying at their free ends opposite jaws forming a throat for receiving the sheets as successively fed, and automatic means for changing the position of said throat, as required, to maintain it in alinement with the front edge of the bottom sheet.

6. In a machine of the kind described, a hopper for a stack of sheets, feeding mechanism for feeding the sheets successively from the bottom of the stack, a delivery device pivoted at the front bottom edge of said stack and provided with arms carrying at their free ends opposite jaws forming a throat for receiving the sheets as successively fed, a lip extending beneath the front edge of the bottom sheet, and means maintaining said throat and lip yieldingly in position.

7. In a machine of the kind described, a hopper for a stack of sheets, feeding mechanism for feeding the sheets successively from the bottom of the stack, a delivery device pivoted at the front bottom edge of said stack, and provided with jaws forming between them a throat for receiving a sheet when fed, the lower jaw carrying a lip extending beneath the front edge of the bottom sheet, and means maintaining said throat and lip yieldingly in position.

8. In a machine of the kind described, a hopper for a stack of sheets, feeding mechanism for feeding the sheets successively from the bottom of the stack, a delivery device pivoted at the front bottom edge of said stack and provided with jaws forming between them a throat for receiving a sheet when fed, the lower jaw being adjustable and carrying a lip extending beneath the front edge of the bottom sheet, and means maintaining said throat and lip yieldingly in position.

9. In a machine of the kind described, a hopper for a stack of sheets, a support for said stack, feed-rolls at the front edge of the bottom sheet for receiving said front edge and pulling the sheet forward when partially fed from beneath the stack, a movable delivery device provided with means for preventing the delivery of the superimposed sheets, automatic means for maintaining said delivery device in position for receiving the bottom sheet, and means for feeding said bottom sheet thereto.

10. In a machine of the kind described, a hopper for a stack of sheets, a support for said stack, feed-rolls at the front edge of the bottom sheet for receiving said front edge and pulling the sheet forward when partially fed from beneath the stack, a movable delivery device provided with means for preventing the delivery of the superimposed sheets, automatic means for maintaining said delivery device in position for receiving the bottom sheet, and feeding mechanism for engaging the bottom sheet and provided with an extension end for supporting the extreme front edge of the sheet as the latter is fed forward to said rolls.

11. In a machine of the kind described, a hopper for a stack of sheets, a support for said stack, feed-rolls at the front edge of the bottom sheet for receiving said front edge and pulling the sheet forward when partially fed from beneath the stack, a movable delivery device provided with means for preventing the delivery of the superimposed sheets, automatic means for maintaining said delivery device in position for receiving the bottom sheet, and feeding mechanism provided with a frictional engaging surface for contacting with the bottom sheet over a considerable area thereof.

12. In a machine of the kind described, a hopper for a stack of sheets, a support therefor, feed-rolls at the front edge of the bottom sheet for receiving said front edge and pulling the sheet forward when partially fed from beneath the stack, and feeding mechanism provided with a frictional engaging surface for contacting with the bottom sheet over a considerable area thereof, and having at its forward end an extension end for supporting the extreme front edge of the sheet as the latter is fed forward to said rolls.

13. In a machine of the kind described, a hopper for a stack of sheets, feeding mechanism consisting of a series of flat arms having their upper surfaces extending in the same plane and provided with a frictional upper surface for contacting with the bottom sheet over a considerable area thereof, means for maintaining said frictional surface in pressing engagement against said bottom sheet and moving the same forward, and means for retracting said feeding mechanism and preventing engagement of said frictional surface with the stack during the backward movement.

14. In a machine of the kind described, a hopper for a stack of sheets, a support having separated slats for supporting said sheets, feeders in the form of parallel slat-like arms extending in the same plane parallel to the bottom sheet and adapted to rise and fall between said slats for simultaneously engaging a large area of said paper, and a four-motion feed-operating mechanism therefor.

15. In a machine of the kind described, a hopper for a stack of sheets, a support having separated slats terminating back from the front of the stack for supporting said sheets, excepting at their front ends, feeders adapted to rise and fall between said slats for engaging said paper, said feeders extending to the front edge of the sheets for supporting the same, and a four-motion feed-operating mechanism therefor.

16. In a machine of the kind described, a hopper for a stack of sheets, a support having separated slats for supporting said sheets, feeders adapted to rise and fall between said slats for engaging said paper, said feeders having an upper surface of highly-frictional material, and shields extending over the rear portions of said feeders and adapted to rest beneath the rear under side of said stack for preventing the disturbance of the superimposed sheets by said feeders, and means for reciprocating said feeders.

17. In a machine of the kind described, a hopper for a stack of sheets, feeding mechanism therefor, having an upper surface of highly-frictional material for engaging a considerable area of the bottom sheet, and a shield extending over the rear portion of said frictional material to rest beneath the rear under side of said stack, and means for reciprocating said feeding mechanism.

18. In a machine of the kind described, a hopper for a stack of sheets, feeding mechanism therefor having an upper surface of highly-frictional material for engaging a considerable area of the bottom sheet, and a stationary shield extending over the rear portion of said frictional material to rest beneath the rear under side of said stack, and means for reciprocating said feeding mechanism.

19. In a machine of the kind described, a hopper for a stack of sheets, feeding mechanism therefor, having an upper surface of highly-frictional material for engaging a considerable area of the bottom sheet, and a shield extending over the rear portion of said frictional material to rest beneath the rear under side of said stack, means for adjusting said shield for different-sized sheets, and means for reciprocating said feeding mechanism.

20. In a machine of the kind described, a hopper for a stack of sheets, a support for said sheets, reciprocating feeding mechanism for feeding said sheets from the bottom of the stack, a four-motion feed-operating mechanism therefor, and means for lowering said operating mechanism out of operative contact with the sheets.

21. In a machine of the kind described, a hopper for a stack of sheets, a slat-like support normally supporting the sheets, but terminating short of their front edges, feed-rolls for receiving the front edge of the sheet being fed and pulling the same from beneath the stack, said feed-rolls being reduced in diameter at short intervals, and feeders for occupying the spaces between the slats, said feeders being provided at their front ends with thin extension ends for supporting the front edge of a sheet and feeding the same between said rolls, said extension ends being in alinement with and entering between said rolls where the latter are reduced in diameter.

22. In a machine of the kind described, a hopper for a stack of sheets, a slat-like support normally supporting the sheets, but terminating short of their front edges, feed-rolls for receiving the front edge of the sheet being fed and pulling the same from beneath the stack, said feed-rolls being reduced in diameter at short intervals, feeders for occupying the spaces between the slats, said feeders being provided at their front ends with thin extension ends for supporting the front edge of a sheet and feeding the same between said rolls, said extension ends being in alinement with and entering between said rolls where the latter are reduced in diameter, and guide-plates for receiving the sheet beyond said feed-rolls, said guide-plates having their receiving ends flared outwardly and provided with nose-shaped oblique edges for facilitating the entry of the paper, said sheets having a series of apertures cut through them, and a second set of feed-rolls operating through said apertures.

23. In a machine of the kind described, means for supporting a stack of sheets, means for feeding the sheets successively, feed-rolls, a stop-gate beyond said feed-rolls, a side gage at one side of the machine, means for momentarily separating said feed-rolls when the sheet reaches said stop-gate, and means provided on said feed-rolls for thereafter automatically shifting the sheet sidewise into register with said side gage.

24. In a machine of the kind described, means for supporting a stack of sheets, means for delivering the same one by one, means for receiving said sheets as delivered, said means including opposite pairs of feed-rolls, a stop-gate beyond said feed-rolls, and means for simultaneously separating said pairs of feed-rolls while the sheet is in engagement with said gate, for permitting the sheet to flatten itself.

25. In a machine of the kind described, means for supporting a stack of sheets, means for delivering the same one by one, means for receiving said sheets as delivered, said means including opposite pairs of feed-rolls, a stop-gate beyond said feed-rolls, a frame carrying the upper rolls of said pairs, and means for raising said frame while the sheet is in engagement with said stop-gate to permit it to recover its normally flat condition.

26. In a machine of the kind described, a plurality of pairs of feed-rolls, means for delivering sheets thereto one by one, a stop-gate, a side gage, and means provided on said feed-rolls for automatically, after the sheet reaches said stop-gate, shifting said sheet sidewise against said side gage.

27. In a machine of the kind described, a plurality of pairs of feed-rolls, means for delivering sheets thereto one by one, a stop-gate, and a side gage, said pairs of feed-rolls having their surfaces composed of beaded spirals, right and left respectively, for automatically shifting the sheet sidewise.

28. In a machine of the kind described, means for feeding a sheet, including a pair of spirally-beaded rolls for receiving said sheet between them, one of said rolls having a right-hand spiral and the other of said rolls having a left-hand spiral adapted to frictionally engage the sheet between them and feed the same, and means for checking the advance movement of the sheet, thereby causing said spirals to feed the sheet laterally.

29. In a machine of the kind described, means for feeding a sheet, including a pair of spirally-beaded rolls for receiving said sheet between them, one of said rolls having a right-hand spiral and the other of said rolls having a left-hand spiral adapted to frictionally engage the sheet between them and feed the same, the projections of one roll being in alinement with the groove of the opposite roll.

30. In a machine of the kind described, means for feeding a sheet, including a pair of feed-rolls, one of which is spirally beaded, and means for checking the advance movement of the sheet for permitting said spiral to shift the sheet laterally.

31. In a machine of the kind described, feeding means including main and secondary feeding-rollers, the main feeding-rollers feeding the sheet through the machine the secondary rollers acting on the sheet at the plurality of points at right angles to the direction in which it is being moved by the main feeding-rollers, said secondary rollers exerting friction on the sheet oppositely toward its edges, to smooth and straighten out the sheet substantially as described.

In testimony whereof I have signed my name to this specification in the presence of two subscribing witnesses.

WILLIAM A. TARBETT.

Witnesses:
   GEO. H. MAXWELL,
   WILHELMINA C. HEUSER.